US008730329B2

(12) United States Patent
Jiang et al.

(10) Patent No.: US 8,730,329 B2
(45) Date of Patent: May 20, 2014

(54) AUTOMATIC ADAPTIVE IMAGE SHARPENING

(75) Inventors: Xiaoyun Jiang, San Diego, CA (US); Eri Haneda, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 13/180,338

(22) Filed: Jul. 11, 2011

(65) Prior Publication Data
US 2013/0016222 A1 Jan. 17, 2013

(51) Int. Cl.
H04N 17/00 (2006.01)
H04N 17/02 (2006.01)
H04N 5/208 (2006.01)
H04N 5/202 (2006.01)
H04N 5/33 (2006.01)
G06K 9/40 (2006.01)

(52) U.S. Cl.
USPC ........... 348/187; 348/252; 348/254; 348/164; 382/260; 382/261

(58) Field of Classification Search
None
See application file for complete search history.

(56) References Cited

U.S. PATENT DOCUMENTS

| 5,696,850 | A * | 12/1997 | Parulski et al. | 382/261 |
|---|---|---|---|---|
| 6,285,799 | B1 | 9/2001 | Dance et al. | |
| 7,545,421 | B2 | 6/2009 | Quan et al. | |
| 7,706,609 | B2 * | 4/2010 | Bennett et al. | 382/167 |
| 8,103,121 | B2 * | 1/2012 | Agarwala et al. | 382/275 |
| 2004/0081364 | A1 * | 4/2004 | Murphy | 382/260 |
| 2007/0104472 | A1 * | 5/2007 | Quan et al. | 396/79 |
| 2008/0031538 | A1 * | 2/2008 | Jiang et al. | 382/261 |
| 2010/0283876 | A1 * | 11/2010 | Chan et al. | 348/252 |
| 2011/0007166 | A1 | 1/2011 | Forestier et al. | |

FOREIGN PATENT DOCUMENTS

WO  WO 2007141368  12/2007
WO  WO 2010129893  11/2010

OTHER PUBLICATIONS

International Search Report and Written Opinion—PCT/US2012/042763—ISA/EPO—Sep. 19, 2012.
Joshi, N. et. al.: "PSF Estimation using Sharp Edge Prediction," Computer Vision and Pattern Recognition, 2008. CVPR 2008. IEEE Conference, IEEE, Piscataway, NJ, USA, Jun. 23, 2008, pp. 1-8, XP031297392 ISBN: 978-1-4244-2242-5.
Biemond J. et al., "Iterative methods for image deblurring", Proceedings of the IEEE, May 31, 1990 vol. 78, Issue 5, pp. 856-883. XP002682466.
Spreeuwers, L., Ph.D. thesis entitled, "Image Filtering with Neural Networks—Applications and performance evaluation", University of Twente, Enschede, Netherlands, Copyright 1992, 170 pages.

(Continued)

Primary Examiner — Jefferey Harold
Assistant Examiner — Sean Haiem
(74) Attorney, Agent, or Firm — Knobbe Martens Olson & Bear LLP

(57) ABSTRACT

This disclosure describes techniques for initially calibrating an image capture device. According to one aspect, the calibration includes calibrating parameters of an image filter for resolving the captured image. The method includes receiving a captured image of a test target and resolving the captured image using a set of initial parameters. A sharpness index of the resolved image is determined without matching the captured image to the test target. The sharpness index is used to minimize a cost function for determining parameters for use by the image capture device.

43 Claims, 10 Drawing Sheets

(56) References Cited

OTHER PUBLICATIONS

International Organization for Standardization (ISO), "Photography—Electronic still-picture cameras—Resolution measurements", Reference No. ISO 12233:2000(E), Sep. 1, 2000, 40 pages.

Snaked D., et al., "Sharpness Measure: Towards Automatic Image Enhancement" Image Processing, 2005. I C I P 2005. IEEE International Conference on Genova, Italy—Sep. 11-14, 2005, Piscataway, NJ, USA, IEEE, vol. 1, Sep. 11, 2005, pages 937-940, XP010850974 ISBN: 978-0-7803-9134-5 * abstract, eqs. (2)-(6).

\* cited by examiner

AUTOMATIC ADAPTIVE IMAGE SHARPENING

TECHNICAL FIELD

One aspect relates to systems and methods for calibrating image sensors in an image capture device. More specifically, aspects relate to adaptive image sharpening systems and methods that operate to calibrate and store image sensor parameters.

DESCRIPTION OF RELATED TECHNOLOGY

Image information captured by image capture devices, such as digital still photo cameras, may be susceptible to noise as a result of physical limitations of the image sensors, interference from illumination sources, and the like. This has become more prevalent as the popularity of small-scale image capture devices, such as mobile wireless communication devices, has grown. The decrease in the size of image sensor modules in such devices, coupled with an increased pixel size, has generally resulted in an increase in the amount of noise captured within each image.

Image quality may vary greatly among different model lines of digital cameras, including small-scale digital cameras which are formed as part of mobile devices. Small-scale digital cameras experience variations in performance due to, for example, variations in the optical components of the devices. These variations can lead to unpredictable image quality, and therefore manufactures of the optical components try to minimize such variations between similar cameras through camera calibration and filtering.

In order to produce commercially acceptable image quality from a small-scale digital camera, such as a cellular phone camera, a camera is normally calibrated at the factory or during use, and then a filtering operation based on such calibration is used to produce a high quality final image. The filtering operation may be designed to enhance image quality by reducing artifacts and/or increasing edge sharpness of the captured image. The process of calibrating the camera to determine an appropriate post-processing procedure for a particular camera is generally referred to as "camera tuning." Typically, camera tuning is repeated whenever a new lens and/or sensor is used in a digital camera.

During camera calibration, a captured image is normally processed through an image signal processing pipeline in order to output a high quality image. The image signal processing pipeline generally has a set of parameters for adjusting various components of a captured image. Image sharpness of the captured image in a camera is generally dependent on calibration of these parameters.

The parameters may be adjusted to compensate for any number of factors which affect the resolution and quality of a captured image. The factors may relate to an image size, a camera's resolution capability (i.e. 12 megapixel, 8 megapixel, etc.), a brightness level of the captured image environment, or for various combinations of components in the camera unit itself. For example, the parameters may be used to adjust for a particular combination of a high quality lens in the camera unit and a lower quality sensor, and vice versa. Other parameters may be used for the combination of a low quality lens with a high quality sensor.

Some conventional systems employ manual optimization of these parameters in order to calibrate a camera. During manual optimization, a technician captures a number of images under various conditions. The technician then manually tunes the various parameters in order to reach an optimized result. The optimized result is therefore based on the judgment and skill of the technician. Unfortunately, differing results are achieved by different technicians performing the calibration. Finally, the manual process is very time consuming as a result of the number of sample images required and number of iterations of tuning performed prior to reaching an optimized result.

Other conventional systems perform a matching operation between a captured image and a test target in order to evaluate sharpness of the captured image and adjust parameters accordingly. A number of test images are captured by an image sensor and are filtered according to a set of parameters. Each of the filtered, or resolved, captured images is matched with the test target. The resolved images are then analyzed for qualify of sharpness based on a comparison of the matched test targets. Since each of the resolved images is directly matched with at test target, a registration process is performed in order to map the resolved images directly with the test targets. A number of reference points on the resolved images are mapped to reference points on the test targets during registration, so that the resolved images may be evaluated. This process, however, is also time consuming. For example, for a five megapixel resolution camera, the process may require up to eight hours for determining the image sensor parameters. Additionally, this process generally requires a large number of test targets in order to configure the various parameters of the image sensor.

SUMMARY

The systems, methods and devices of the disclosure each have several innovative aspects, no single one of which is solely responsible for the desirable attributes disclosed herein.

According to one aspect, a method for initially calibrating an image capture device is disclosed. The method includes receiving a captured image of at least one test target, resolving the captured image, and determining at least one sharpness index based on the resolved image. The at least one sharpness index is determined without matching the captured image to the at least one test target. The method further includes determining a cost function based on the at least one sharpness index, minimizing the cost function to determine sharpness parameters, and storing the sharpness parameters for use by the image capture device.

According to another aspect, an apparatus for initially calibrating an image capture device is disclosed. The apparatus includes means for receiving a captured image of at least one test target, means for resolving the captured image, and means for determining at least one sharpness index based on the resolved image. The at least one sharpness index is determined without matching the captured image to the at least one test target. The apparatus further includes means for determining a cost function based on the at least one sharpness index, means for minimizing the cost function to determine sharpness parameters, and means for storing the sharpness parameters for use by the image capture device.

According to another aspect, a non-transitory computer-readable medium having stored thereon code that when executed performs a method is disclosed. The method performed by the executed code includes receiving a captured image of at least one test target, resolving the captured image, and determining at least one sharpness index based on the resolved image. The at least one sharpness index is determined without matching the captured image to the at least one test target. The method further includes determining a cost function based on the at least one sharpness index, minimizing the cost function to determine sharpness parameters, and storing the sharpness parameters for use by the image capture device.

According to another aspect, an apparatus for initially calibrating an image capture device is disclosed. The apparatus includes a filter configured to receive a captured image and resolve the captured image, and a parameter determination module. The parameter determination module is configured to determine at least one sharpness index based on the resolved image. The at least one sharpness index is determined without matching the captured image to the at least one test target. The parameter determination module is further configured to determine a cost function based on the at least one sharpness index, minimize the cost function to determine sharpness parameters, and store the sharpness parameters for use by the image capture device.

Details of one or more implementations of the subject matter described in this specification are set forth in the accompanying drawings and the description below. Other features, aspects, and advantages will become apparent from the description, the drawings, and the claims.

DETAILED DESCRIPTION

One aspect is a system and method for performing automatic adaptive image sharpening that doesn't require a registration process to map a captured image to a target. As used herein, a "target" is a physical or printed image that has specific features that are designed to calibrate a camera. For example, a target may have dark and light regions, or slanted and straight edges. The target is normally configured so that an image captured of the target can be analyzed for specific features during calibration. The system may generally include an adaptive sharpening filter (ASF) simulator as part of an adaptive spatial sharpening block. The ASF simulator may include a set of parameters for adjusting various components of a captured image. Sample images, and an initial set of parameters may be used as an input to the ASF simulator. The ASF simulator may then output an image based on the set of initial parameters. The image may be evaluated based on a process for maximizing a sharpness of the captured image without matching the resolved image captured by the camera with the test targets. For example, a frequency domain analysis of the resolved images may be performed in order to calibrate the image sensor parameters. The parameters may be further adjusted by the system based on a result of the frequency domain analysis. The optimized parameters may then be stored in the camera for resolving captured images.

In one embodiment, a test target, or set of test targets, are captured by an image capture device without ASF filtering. The images are then transmitted to an automatic parameter optimization system that resolves the captured images using an ASF based on a set of initial parameters. A cost function of the resolved image at an output of the ASF may then be calculated. The cost function may generally include a sharpness evaluation of the resolved captured images from the test targets, which will be described in greater detail below. The system may then determine whether an optimization stopping criteria has been reached based on a minimization of the cost function. If the optimization stopping criteria has been reached, the optimized parameters are output as the stored parameters for use by the camera's ASF. If the cost function is not minimized, an optimization stopping criteria is not reached, and the parameters are updated and fed back to the ASF simulator. The ASF simulator continues to process the captured images based on feedback until a cost function is minimized.

Figure 1:
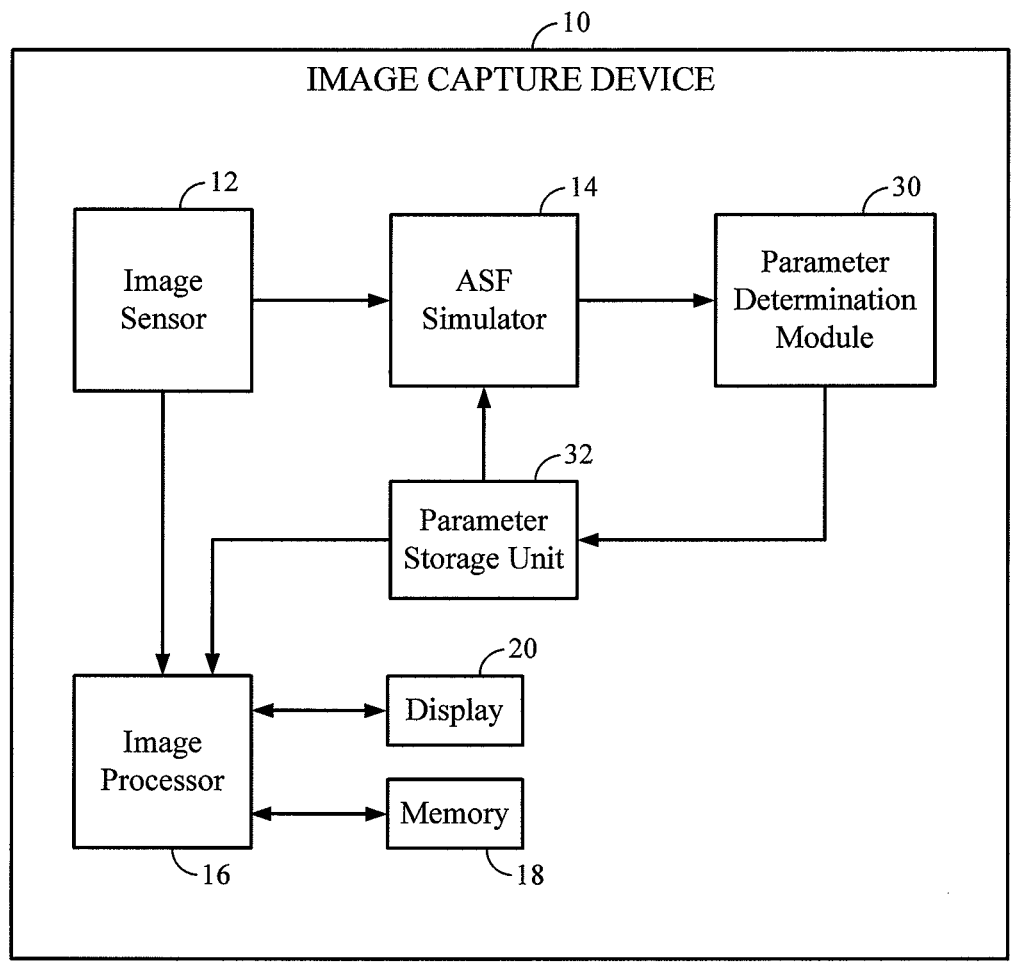
FIG. 1 is a block diagram illustrating an exemplary image capture device for capturing image information.

Referring now to FIG. 1, an exemplary image capture device 10 will now be described in greater detail. As shown in FIG. 1, the image capture device 10 includes an image sensor 12, an adaptive spatial image filter (ASF) simulator 14, an image processor 16, a memory 18, a display 20, a parameter determination module 30, and a parameter storage unit 32.

The imaging capture device 10 as used herein includes, for example, an electronic camera, video recorder, a web camera, a camera built into a portable or mobile computer, including but not limited to, a cellular telephone, smart phone, portable media player, personal digital assistant, a laptop, or a tablet computer. Image capture device 10 may be a digital camera, such as a digital video camera, a digital still image camera, or a combination of both. Image capture device 10 may be a stand-alone device, such as a stand-alone camera, or be integrated in another multi-purpose device, such as a wireless communication device. Image capture device 10 may be equipped to capture color imagery, black-and-white imagery, or both. In this disclosure, the term "image," or similar terms may interchangeably refer to either video or still pictures.

The image capture device 10 includes the image sensor 12 for capturing external images. The image sensor 12 can be, for example, a charge-coupled device (CCD), a complementary metal-oxide semiconductor (CMOS) sensor, or the like. The image sensor 12 may be coupled to the image processor 16 to transmit a captured image to the image processor 16. The image processor 16 may be configured to perform various post-processing operations on a received captured image in order to output a high quality image.

Still referring to FIG. 1, the image processor 16 is further coupled to the memory 18 and the display 20. The image processor 16 controls the processing, storage and display of the digital image received from the image sensor 12. The memory 18 may be configured as any storage media device. For example, the system memory 18 may include a disk drive, such as a floppy disk drive, hard disk drive, optical disk drive or magneto-optical disk drive, or a solid state memory such as a FLASH memory, RAM, ROM, and/or EEPROM. The memory 18 can also include multiple memory units, and any one of the memory units may be configured to be within the image capture device 10, or may be external to the image capture device 10. For example, the memory 18 may include a ROM memory containing system program instructions stored within the image capture device 10. The memory 18 may also include memory cards or high speed memories configured to store captured images which may be removable from the camera.

The image processor 16 may be further configured to control the display 20 to display the captured image to a user. The display 20 may be external to the imaging device 10 or may be part of the imaging device 10. The display 20 may also be configured to provide a view finder for a user prior to capturing an image, or may be configured to display a captured image stored in memory or recently captured by the user.

The image capture device 10 also includes a parameter determination module 30, and a parameter storage unit 32. The parameter determination module 30 is configured to calibrate and determine the parameters to be used by the ASF simulator 14 and the image processor 16, and store the determined parameters to the parameter storage unit 32 for use by the image processor 16. The images captured by the image sensor 12 may be sent to either the ASF simulator 14 or the image processor 16. If the image capture device 10 has not been calibrated, or the calibration needs to be updated, the captured images are sent to the ASF simulator 14, such that the ASF parameters may be optimized by the parameter determination module 30. Once the parameters are determined, the parameters are stored to a parameter storage unit 32 for use by the image processor 16.

The features illustrated in FIG. 1 may be realized by any suitable combination of hardware or software components. Depiction of different features as units is intended to highlight different functional aspects of image capture device 10, and does not necessarily imply that such units must be realized by separate hardware or software components. Rather, functionality associated with one or more units may be integrated within common hardware or software components. For example, the ASF simulator 14 and the parameter determination module 30 may be provided externally from the image capture device 10, such the ASF simulator 14 and the parameter determination module 30 may be configured to determine parameters for a plurality of image capture devices 10.

Other aspects may offload the ASF simulator to an external system. For an external ASF simulator and parameter determination module, the images are captured by the image sensor of an image capture device, and are processed without filtering by the image capture device. The unfiltered, or unresolved images, are then transferred to the external ASF simulator which is coupled to a parameter determination module for filtering the received images based on a set of initial parameters. The set of initial parameters may be stored into a remote local parameter storage unit. The parameter determination module may then transfer the determined sharpness parameters to a parameter storage unit of the image capture device.

Figure 2:
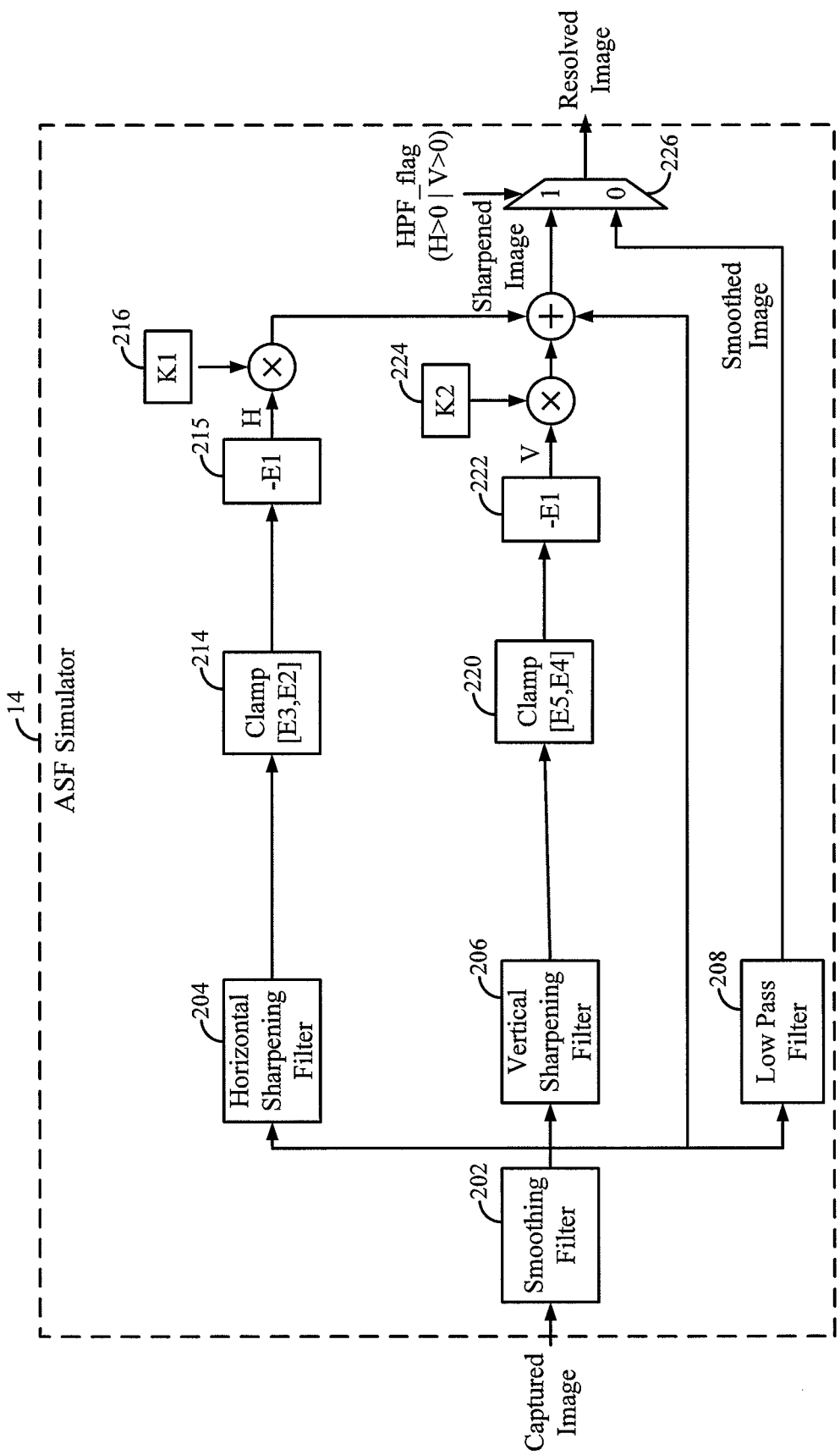
FIG. 2 illustrates a block diagram of various components of an adaptive spatial filter according to some exemplary implementations.

The ASF simulator 14 will now be described in greater detail with reference to FIG. 2. FIG. 2 illustrates a block diagram of various components of an adaptive spatial filter according to some exemplary implementations. The ASF simulator 14 is configured to simulate a filtering operation which is performed by an image processor 16 of the image capture device. Therefore, components of the ASF simulator 14 also correspond to an adaptive spatial filter which is contained in an image processor unit 16 of the image capture device 10. As a result, one of skill in the art will recognize that description of the components of the ASF simulator 14 also applies to the components of the ASF contained in the image processor 16.

The ASF simulator 14 performs a post-processing procedure on one or more of the captured images to obtain corresponding resolved images. For example, ASF simulator 14 may be configured to perform an adaptive spatial filtering operation such as any among the range of those described in U.S. Publ. Pat. Appl. No. 2008/0031538, entitled "ADAPTIVE SPATIAL FILTER FOR FILTERING IMAGE INFORMATION" ("Jiang"), which is incorporated herein by reference. Such an adaptive spatial filter, which may have a large number of parameters, may be configured to reduce noise while finding an optimal balance between edge sharpness and artifact generation.

According to some exemplary implementations, a captured image is first sent to a smoothing filter 202 in the ASF simulator 14. The smoothing filter 202 may correspond to a 3×3 low pass filter which is applied to the entire image. An example smoothing filter may correspond to a smoothing filter according to Equation 1 below:

$$F_{3\times3\_LPF} = \begin{bmatrix} 14 & 14 & 14 \\ 14 & 16 & 14 \\ 14 & 14 & 14 \end{bmatrix} \cdot SC_1 + \left(1 - \frac{SP_{3\times3}}{100}\right) \cdot \begin{bmatrix} -1 & -1 & -1 \\ -1 & 8 & -1 \\ -1 & -1 & -1 \end{bmatrix} \cdot SC_2 \qquad \text{Eq. (1)}$$

wherein $SC_1$ and $SC_2$ correspond to predetermined smoothing constants, and $SP_{3\times3}$ corresponds to a smoothing degree. ASF simulator 14 sets the smoothing degree $SP_{3\times3}$ parameter with the associated smoothing degree $SP_{3\times3}$ parameter according to an initial set of parameters stored in parameter storage unit 32. The smoothing degree $SP_{3\times3}$ may be expressed as a percentage of the smoothing degree. When $SP_{3\times3}=0\%$, the filter is a filter with no smoothing effect. When $SP_{3\times3}=100\%$, the filter is an average filter with the maximum smoothing effect achievable by the given filter, e.g., a 3×3 filter.

After passing through the smoothing filter 202, a captured image may enter a series of filters. As shown in FIG. 2, the ASF simulator 14 also includes a horizontal sharpening filter 204, and a vertical sharpening filter 206. The vertical sharpening filter 206, and horizontal sharpening filter 204 may be configured as 5×5 high pass filters. For example, a vertical sharpening filter 206 may correspond to F1 and a horizontal sharpening filter 204 may correspond to a filter F2 according to Equation 2 below:

$$F1 = \begin{bmatrix} 0 & 0 & 0 & 0 & 0 \\ -1 & 0 & 2 & 0 & -1 \\ -2 & 0 & 4 & 0 & -2 \\ -1 & 0 & 2 & 0 & -1 \\ 0 & 0 & 0 & 0 & 0 \end{bmatrix} \Big/ 4 \qquad \text{Eq. (2)}$$

$$F2 = \begin{bmatrix} 0 & -1 & -2 & -1 & 0 \\ 0 & 0 & 0 & 0 & 0 \\ 0 & 2 & 4 & 2 & 0 \\ 0 & 0 & 0 & 0 & 0 \\ 0 & -1 & -2 & -1 & 0 \end{bmatrix} \Big/ 4$$

The output of the horizontal sharpening filter 204 is received by a clamp unit 214, having clamp values E2 and E3. E2 may correspond to a maximum positive sharpening limit, and E3 may correspond to a maximum negative sharpening limit. The clamp unit 214 is configured to adjust the output of the horizontally filtered image such that signals which are outside of the sharpening window defined by E2 and E3 are excluded. The clamped output is received at a subtraction unit 215 which subtracts a subtraction threshold E1 from the clamped signal. The output of the subtraction unit 215 is received by a multiplier which multiplies the signal by a horizontal sharpening degree 216 equal to K1.

The signal is then received by a clamp unit 220, which clamps the signal based on a maximum positive sharpening limit E4, and a maximum negative sharpening limit E5. The clamp unit 220 is configured to adjust the output of the vertically filtered image such that signals which are outside of the sharpening window defined by E4 and E5 are excluded. The clamped output is received at a subtraction unit 222 which subtracts a subtraction threshold E1 from the clamped signal. The output of the subtraction unit 222 is received by a multiplier which multiplies the signal by a vertical sharpening degree 224 equal to K2.

An addition unit receives the output of the vertical sharpened signal K2xV, the horizontal sharpened signal K1xH, and the output of the smoothing filter 202 and combines the signals to produce a sharpened image. As a result, high pass signals which are larger than E1 are smoothed by the smoothing filter 202 and sharpened by the sharpening filters 204 and 206. Signals which are less than E1 are smoothed by the smoothing filter 202, and a combined sharpened image is produced. According to some implementations, the addition unit may add the vertical sharpened image, the horizontal sharpened image, and the smoothed image by assigning predetermined weight coefficients. Furthermore, application of the horizontal and vertical sharpening filters 204 and 206 may occur simultaneously, and in other exemplary implementations, application of these filters may occur sequentially.

The sharpened image is received by a selector 226 which also receives a smoothed image which is smoothed by smoothing filter 202, and low pass filter 208. Smoothing filter 202 may be configured as a high pass smoothing filter as discussed above, and low pass filter 208 may be configured as a 5×5 low pass filter to smooth the low frequency components of the captured image. Similar to the 3×3 smoothing filter 202, the 5×5 smoothing filter may include a smoothing degree $SP_{5 \times 5}$ which controls the amount of smoothing to be applied by the low pass filter 208. For example, low-pass filter 208 may be configured as a Gaussian filter, such that if the image falls with a smoothing range, the Gaussian filter is applied. The operation of the Gaussian filter may be described according to Equation 3 below:

$$g(x, y) \cong e^{-\left(\frac{x^2+y^2}{2\sigma^2}\right)} \text{ and } \sigma = e^{sp_{5 \times 5}/50 - 1} \qquad \text{Eq. (3)}$$

wherein x equals the distance from the origin in the horizontal axis, y equals the distance from the origin in the vertical axis, and a is the standard deviation of the Gaussian distribution. As a result, the smoothing degree of the low-pass filter 208 may be controlled such that if $SP_{5 \times 5}$ is large, more smoothing occurs, and if $SP_{5 \times 5}$ is small, less smoothing occurs.

A selector 226 is configured to select one of the sharpened image and the smoothed image as an output based on an high pass filter flag (HPF_flag). Since horizontal or vertical sharpened signals may correspond to noise signals, the HPF_Flag is set to 1 such that the selector 226 is configured to select the sharpened signal if the horizontal or vertical sharpened signal is greater than 0 (e.g. H>0|V>0). In the case that the horizontal and vertical sharpened signals are not greater than 0, the HPF_Flag is set to 0 such that the selector 226 is configured to select the smoothed signal.

As discussed above, ASF simulator 14 may provide adjustable noise reduction control, horizontal and vertical sharpening degree control, and maximum sharpening effect control. In addition, the efficiency of the ASF simulator 14 can be controlled according to illumination light intensity, image size, and scaling factors. In particular, ASF simulator 14 may adapt to a current exposure level and a current scaling level for image information obtained by image sensor 12. Thus, the ASF simulator 14 provides a means for resolving a captured image.

The parameters of the image processor 16 for resolving a captured image may be set according the parameters stored in parameter storage unit 32. These parameters include horizontal sharpening degree K1, vertical sharpening degree K2 of respective horizontal sharpening filter 204 and vertical sharpening filter 206. The parameters also include the lower bound of sharpening range E1, and values corresponding to clamping range, provided as values E2-E5 as discussed above. Furthermore, the smoothing degree $SP_{3 \times 3}$ and the smoothing degree $SP_{5 \times 5}$ discussed above may be set according to the parameters of the parameter storage unit 32.

Figure 3:
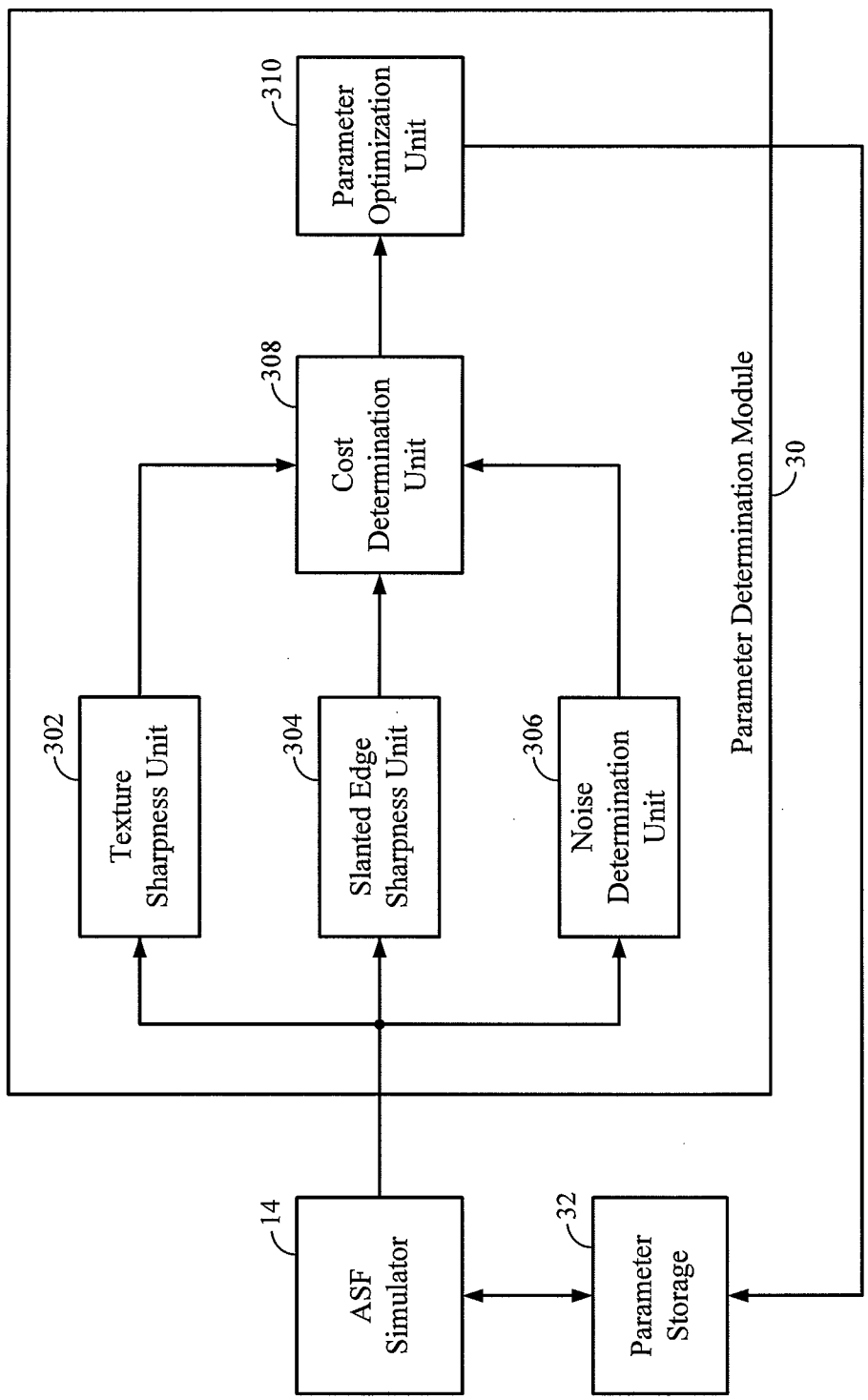
FIG. 3 illustrates a block diagram of components of parameter storage module 30 according to some exemplary implementations.

The parameters stored in the parameter storage unit 32 are determined by the parameter determination module 30. The parameter determination module 30 will now be described in greater detail with reference to FIG. 3. FIG. 3 illustrates a block diagram of components of parameter storage module 30 according to some exemplary implementations. The parameter storage module 30 includes a texture sharpness unit 302, a slanted edge sharpness unit 304, and a noise determination unit 306. An image captured by an image sensor 12 is resolved by the ASF simulator 14 according to a set of initial parameters as discussed above. The resolved image is then analyzed by the parameter determination module 30. The texture sharpness unit 302 determines a texture sharpness index of the resolved image. The slanted edge sharpness unit 304 determines a slanted edge sharpness index of the resolved image. Each of the texture sharpness unit 302 and the slanted edge sharpness unit 304 may include instructions for calculating a texture sharpness index and a slanted edge sharpness index, respectively. Thus, the instructions provided in the texture sharpness unit 302 and the slanted edge sharpness unit 304 each provide a means for determining at least one sharpness index. The noise determination unit 306 determines a noise index of the resolved image. Each index produced by units 302, 304, and 306 is received by a cost determination unit 308.

The cost determination unit 308 generates a cost function including the sharpness indices provided by texture sharpness unit 302, slanted edge sharpness unit 304, and noise determination unit 306. The cost function includes one or more of a slanted edge sharpness term, oversharpening measurement terms, a texture sharpness term, and a noise term which will be described in greater detail below. The cost determination unit 308 may include instructions for calculating a cost function as a sum of at least one sharpness index. Thus, the instructions included in the cost determination unit 308 provide a means for determining a cost function based on at least one sharpness index. The result of the cost determination unit 308 is output to a parameter optimization unit 310.

The parameter optimization unit 310 determines, based on a set of instructions, whether the cost function has been minimized based on the result of the cost determination unit 308. The instructions included in the parameter optimization unit 310 may include determining whether the sum of the sharpness indices of the cost function is below a predetermined quality threshold. Additionally, the instructions may be configured to determine that the cost function has been minimized if a number of iterations of updating the filtering parameters has exceeded a predetermined threshold. Thus, the instructions provided in the parameter optimization unit 310 provide a means for minimizing the cost function based on a quality threshold and a number of iterations of updating the filtering parameters. When a cost function is minimized, sharpness parameters which are determined by the parameter optimization unit 310 are subsequently stored to the parameter storage unit 32 for use by the image processor 16. The parameter storage unit 32 is configured as a memory which provides a means for storing the sharpness parameters.

Figure 4:
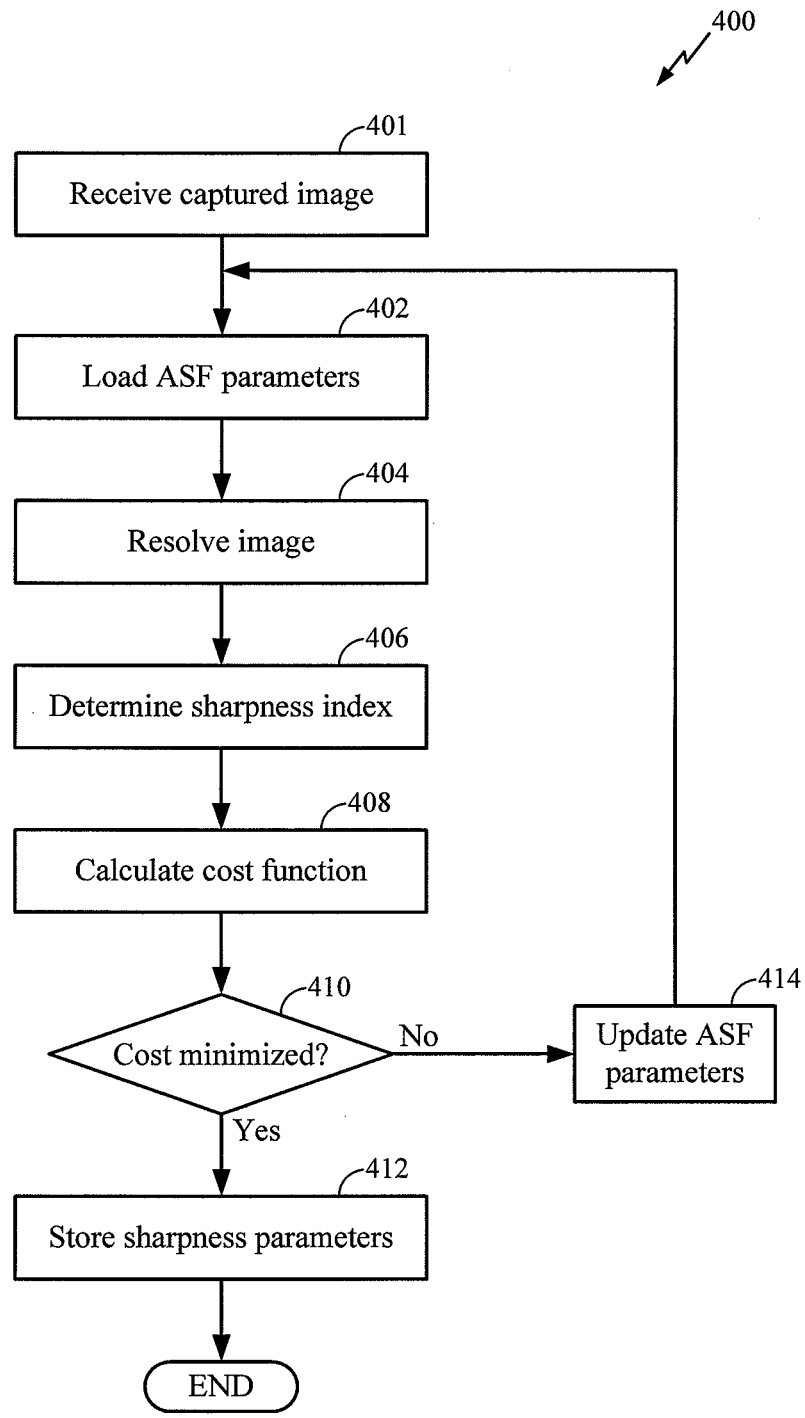
FIG. 4 illustrates a flow chart of a method of determining sharpness parameters according to some exemplary implementations.

The determination of ASF sharpness parameters will be described in greater detail with reference to FIG. 4. FIG. 4 illustrates a flow chart of a method of determining sharpness parameters according to some exemplary implementations. As illustrated in FIG. 4, a captured image is received at block 400. ASF parameters for filtering the captured image are loaded at block 402. The loaded ASF parameters may correspond to an initial set of ASF parameters which are predetermined. The captured image is resolved based on the initial parameters at block 404. For example, the captured image is resolved by an ASF simulator as discussed above with respect to FIG. 3.

At least one sharpness index is determined by analyzing the resolved image for sharpness at block 406. The at least one sharpness index may be determined by a slanted edge sharpness unit and a texture sharpness unit as will be described in greater detail with reference to FIGS. 5-7 below. A cost function is generated which includes the at least one sharpness index at block 408. The cost function may include a weighted sum of each of the sharpness indices. At decision block 410, it is determined whether the cost function has been minimized. That is, the weighted sum of the cost function is determined, and it is determined whether the sum is below a predetermined image quality threshold or if a number of iterations of the method 400 has exceeded a predetermined threshold. For example, the cost function may be minimized based on a differential evolution method as will be described in greater detail below. If the cost function has been minimized, the method determines that the ASF parameters correspond to optimum sharpness parameters for the ASF. The sharpness parameters are stored for use by an image processor of the image capture device at block 412.

If it is determined at decision block 410 that the cost function has not been minimized, the ASF parameters are updated at block 414. The updated parameters are stored to the parameter storage unit for subsequent filtering operations of the captured images. The method then returns to block 402, where the updated ASF parameters are loaded for filtering the captured image. The method continues to iteratively resolve the captured image and update the ASF parameters until the cost function has been minimized at decision block 410.

Figure 5:
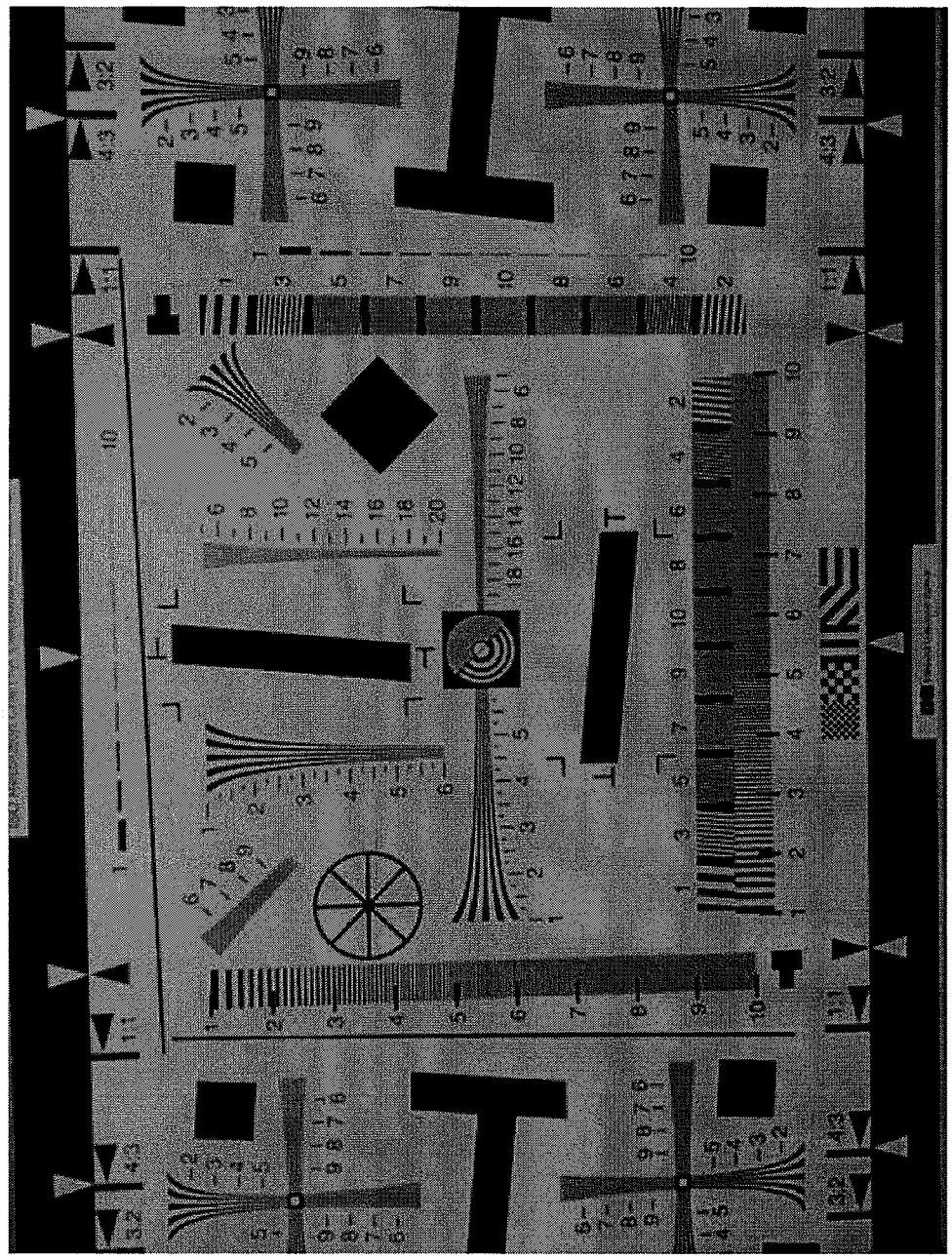
FIG. 5 illustrates an example of a slanted edge test target according to some exemplary implementations.

Test targets may be configured to provide the images to be captured for calculating the sharpness terms of the cost function. The test targets may generally include a slanted edge image test target, a dead-leaf image test target, or the like. FIG. 5 illustrates an example of a slanted edge test target according to some exemplary implementations. The slanted edge test target illustrated in FIG. 5 may be used to calculate a slanted edge modular transfer function ($MTF_{slant}$) as one sharpness index of an image filtered by the ASF simulator 14.

The modular transfer function (MTF) is a representation of the spatial frequency response of an image. The MTF provides a measure of the contrast of a captured image including a number of lines which are spaced at a predetermined frequency. The MTF provides a measure of the level of detail, or sharpness, transferred from an object to the captured image. The method of calculating the MTF may be similar to that described by an MTF calculation for a slanted edge described in the ISO 12233 methodology. In the below description, the frequency described corresponds to cycles, or line pairs per pixel. However, one of skill in the art will recognize that the frequency can correspond to other values, such as line pairs per millimeter, or line pairs per inch.

The method of calculating a slanted edge MTF includes capturing an image of a test target, such as the test target of FIG. 5, having a straight edge. One of skill in the art will recognize that the test target illustrated in FIG. 5 is exemplary, and any number of different test targets including a straight edge may be used to calculate a slanted edge MTF. For example, the straight edge may be a set of step functions. The captured image may be mapped by super-resolution mapping. An edge spread function (ESF) is calculated to represent the pixel intensity and pixel position at an edge of each line of the mapped image array. A first derivative of the ESF is calculated to obtain a line spread function (LSF). The Fourier transform of the LSF represents the MTF of the captured image.

The slanted edge MTF can then be described according to Equation 4 below:

$$MTF = DFT[LSF] \qquad \text{Eq. (4).}$$

wherein DFT[LSF] is the discrete Fourier transform of the line spread function (LSF). The slanted edge MTF may be provided as one index of sharpness of the filtered image in determining the sharpness parameters with the cost function discussed above.

Figure 6:
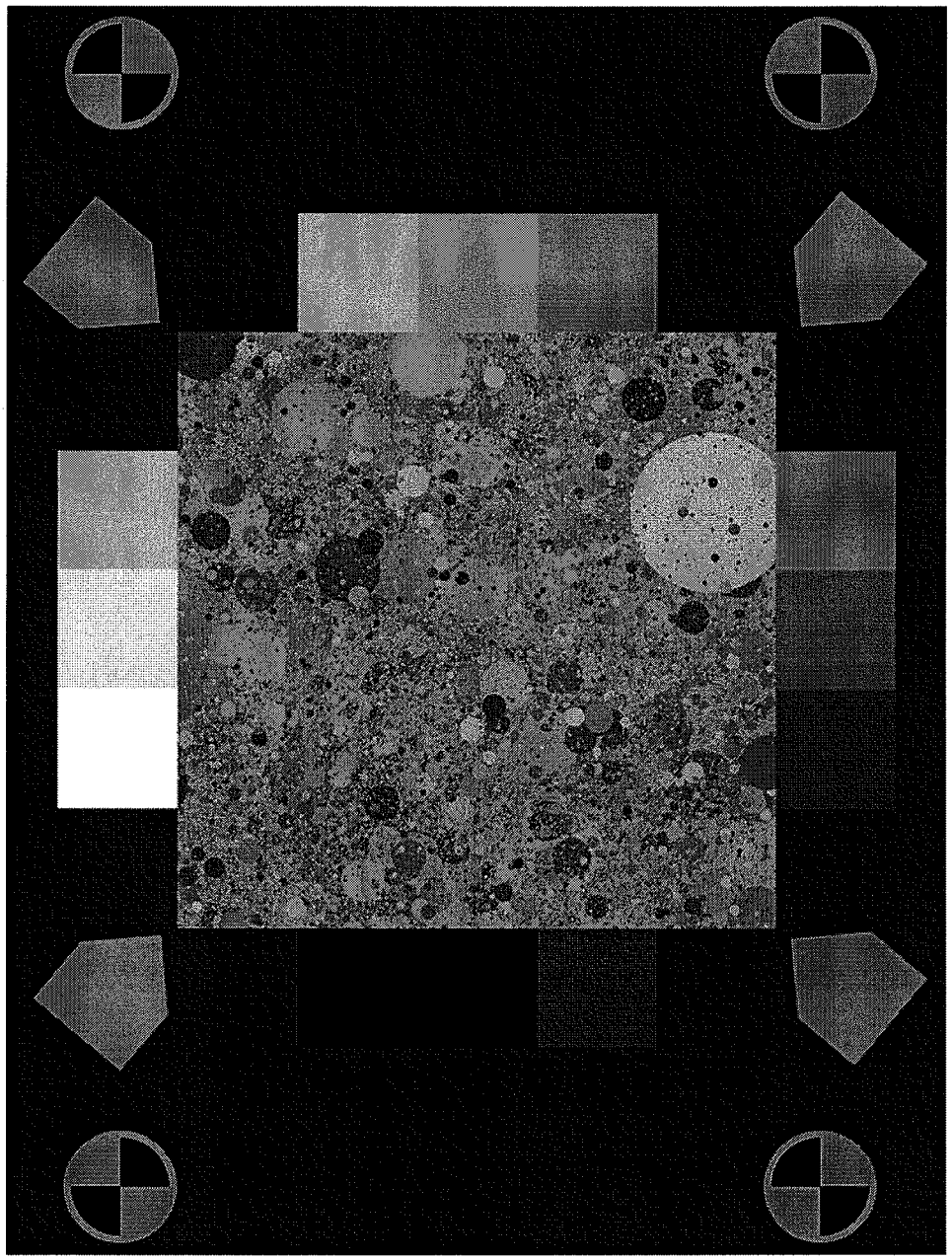
FIG. 6 illustrates an example of a texture test target according to some exemplary implementations.

The cost function may also include a sharpness index based on a captured texture test target. FIG. 6 illustrates an example of a texture test target according to some exemplary implementations. The texture test target illustrated in FIG. 6 is a dead-leaves model which contains statistical properties coinciding with empirical facts drawn from natural images. As illustrated in FIG. 6, the texture test target contains circles of different sizes, edges of different contrast, and edges situated in different directions. The features of the test target may be captured and analyzed to produce indices of sharpness for the image capture device 10.

One sharpness index that can be calculated based on the texture test target is a texture modular transfer function ($MTF_{txt}$). As discussed above, the MTF provides a measure of sharpness of a resolved image based on a frequency domain analysis of the image. The process of calculating a texture MTF will now be described in greater detail with reference to FIG. 7.

Figure 7:
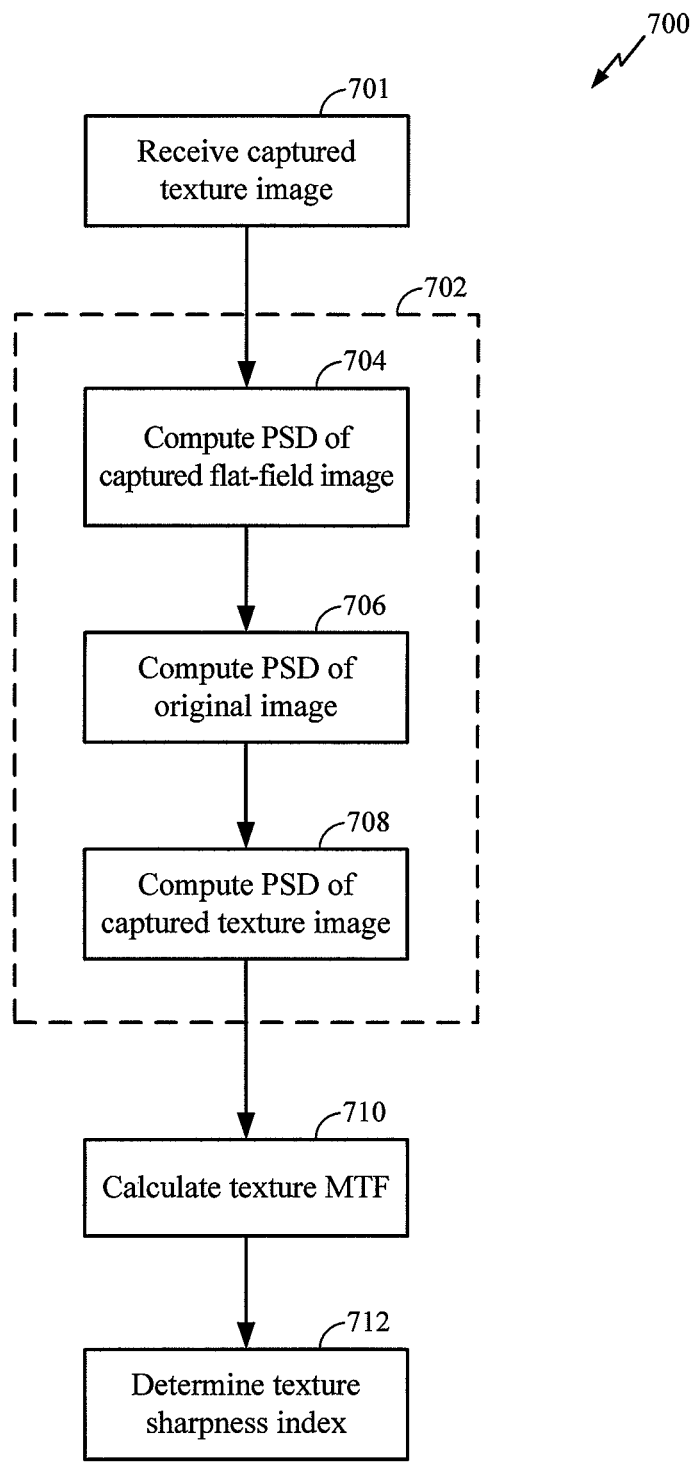
FIG. 7 illustrates a flowchart of a method of calculating a texture MTF according to some exemplary implementations.

FIG. 7 illustrates a flowchart of a method 700 of calculating a texture MTF according to some exemplary implementations. At block 701, a capture image corresponding to a texture test target is received. The texture test target may be the texture target of FIG. 6 or a similar texture test target. At block 702, the method 700 calculates a power spectral density (PSD) of 1) a captured flat-field image, 2) the original image, and 3) the captured texture image. For example, as illustrated in FIG. 7, the method calculates a power spectral density (PSD) of a captured flat-field image at block 704.

The process of calculating a power spectral density may be performed by computing a two-dimensional power spectrum of a digital original texture test target, a captured image of the texture target, and the captured flat-field image. The two-dimensional power spectrum corresponds to a power spectrum mapping of pixels in an X and Y direction of the images. An average value of the two-dimensional power spectrum may be calculated in order to obtain a one-dimensional power spectrum as a function of radial frequency. For example, the average may be calculated annularly by assuming radial symmetry, such that the two-dimension power spectrum may be mapped as a one-dimensional power spectrum. The one-dimensional power spectrum may be used to derive the power spectral density of the images discussed above. One of skill in the art will recognize that the process of calculating a power spectral density is not limited to the above describe method, and may be calculated by any number of different methods.

The captured flat-field image corresponds to an image which is captured by an image sensor which has been calibrated to remove artifacts which are caused by variations in the pixels of the image sensor. For example, an image capture device may include a set of parameters for calibrating the image capture device to capture a flat-field image. The parameters may be determined by gamma curve calibration, or similar flat-field correction techniques. The test target may then be captured by an image sensor according to the flat-field correction parameters. A power spectral density of the captured flat-field image is then calculated. This function may be denoted as $PSD_{noise}(f)$ which corresponds to the power spectral density of the noise of a captured image derived from the calculation of the power spectral density of the captured flat-field image.

At block 706, the method 700 calculates a power spectral density (PSD) of the original image. For example, the method may calculate a power spectral density of the original image by analyzing the power spectral density of the texture test target illustrated in FIG. 6. Data corresponding to the texture test target may be stored in the parameter determination module 30, or provided as an input to a texture sharpness unit 302 in order to calculate the power spectral density of the original test target. This function may be denoted as $PSD_{ideal}(f)$, which corresponds to the power spectral density of the original texture test target. Once calculated, the power spectral density of the texture test target may be stored in the parameter determination module 30 for use in calculating a texture MTF in subsequent iterations of the method of determining sharpness parameters. Alternatively, the power spectral density of the texture test target may previously be calculated and stored in the image capture device 10.

At block 708, the power spectral density (PSD) of the captured texture image is calculated. The captured texture image corresponds to the image of the texture test target as captured by the image sensor. This function may be denoted as $PSD_{meas}(f)$, which corresponds to the power spectral density measured for the captured texture test target image. Each of the method blocks 704, 706, and 708 corresponding to calculation of power spectral density may be performed in any order, or may be performed simultaneously.

At block 710, the method calculates the texture modular transfer function ($MTF_{txt}$) based on the calculated power spectral densities. The calculation of the texture MTF may be described according to Equation 5 below:

$$MTF_{txt}(f) = \sqrt{\frac{PSD_{meas}(f) - PSD_{noise}(f)}{PSD_{ideal}(f)}} \qquad \text{Eq. (5)}$$

wherein $PSD_{meas}(f)$ corresponds to the power spectral density measured for the captured texture test target image, $PSD_{noise}(f)$ corresponds to the power spectral density of the noise of a captured image derived from the calculation of the power spectral density of the captured flat-field image, and $PSD_{ideal}(f)$ corresponds to the power spectral density of the original texture test target. A texture sharpness index corresponding to the calculated value for $MTF_{txt}$ may then be determined at block 712.

The texture MTF ($MTF_{txt}$) and the slanted edge MTF ($MTF_{slant}$) may be used to calculate a subjective quality factor (SQF) sharpness measurement. The subjective quality factor is an evaluation of sharpness based on an MTF curve. The SQF may be calculated according to Equation 6 below:

$$SQF = A\int_f [HVC^*MTF]^*d(\log f) \qquad \text{Eq. (6)}$$

wherein A corresponds to a predetermined constant, the integral of HVC*MTF is taken for the range corresponding to frequency f, HVC corresponds to the human visual contrast sensitivity function, MTF corresponds to a modular transfer function, and d(log f) corresponds to the derivative of the logarithm of frequency f. By calculating the subjective quality factor, an SQF of the texture MTF and the slanted edge MTF may be provided to a cost function as sharpness indices. Since the SQF provides a numerical evaluation of sharpness, rather than the sharpness index based a function of frequency, the calculations performed in the cost function may be simplified.

Figure 8:
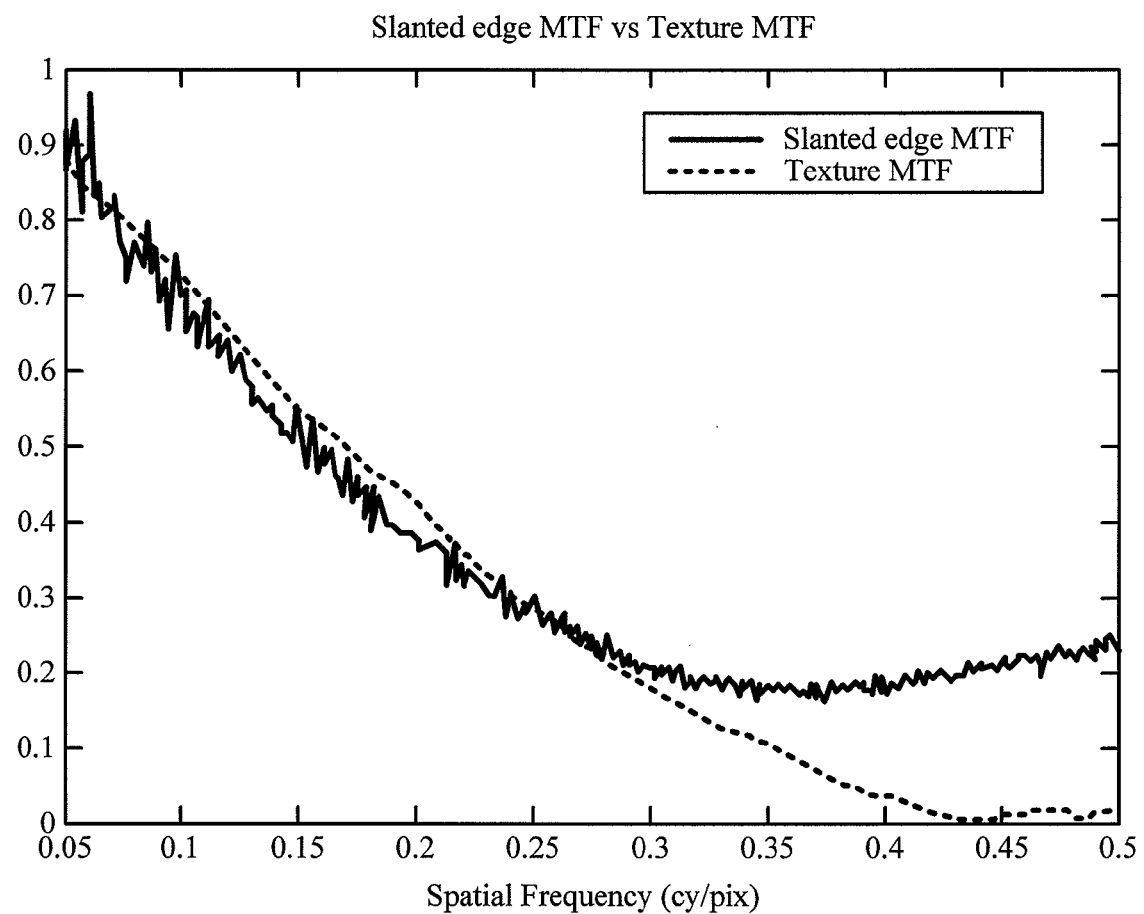
FIG. 8 illustrates an example plot of a slanted edge MTF and a texture MTF at different frequencies.

Each of the parameters which are adjusted by the parameter determination module 30 may impact the slanted edge MTF and texture MTF previously discussed. FIG. 8 illustrates an example plot of a slanted edge MTF and a texture MTF at different frequencies. As discussed above, the frequency is provided in terms of cycles, or line pairs, per pixel.

Figure 9:
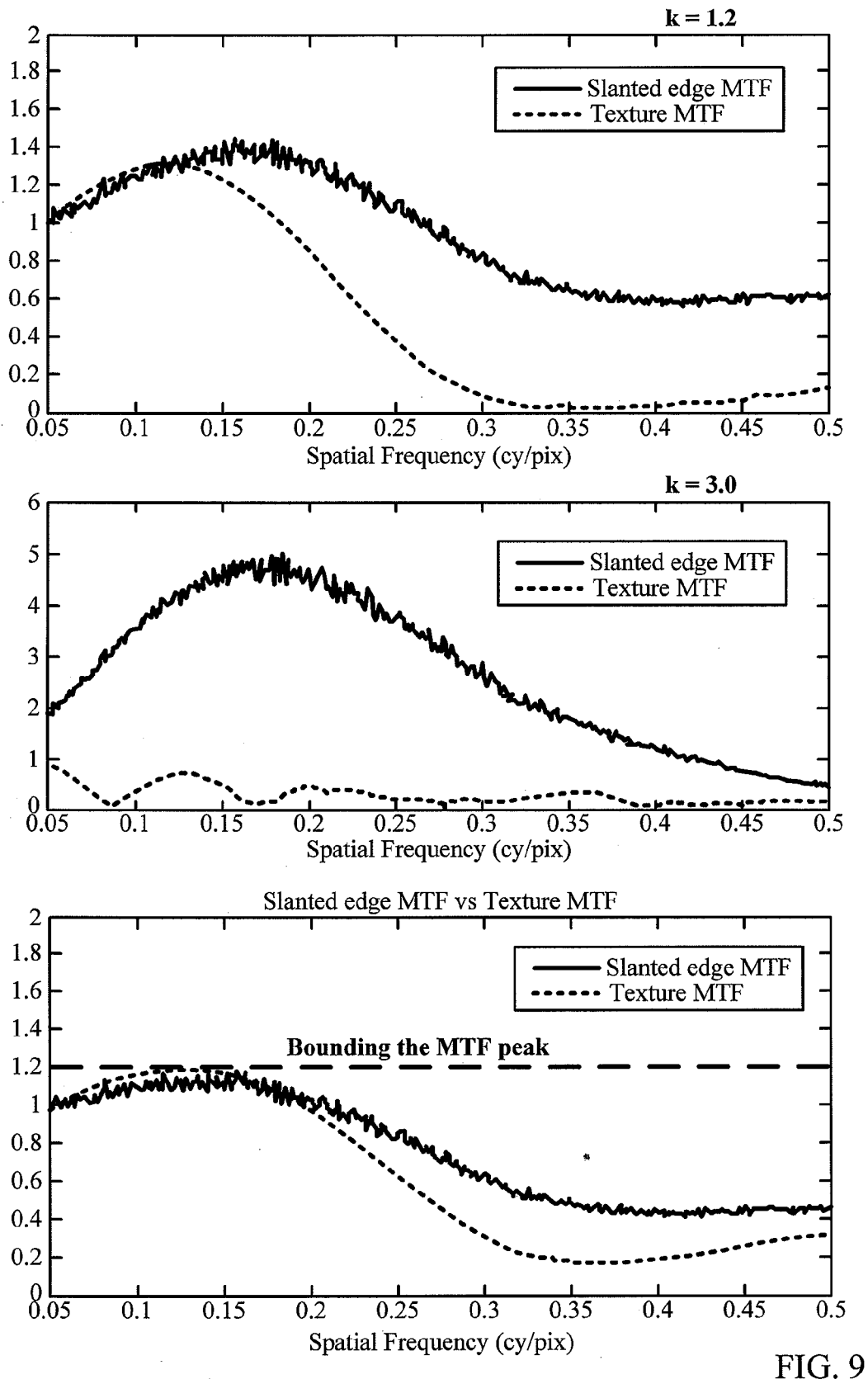
FIG. 9 illustrates plots of a slanted edge MTF and a texture MTF according to some exemplary implementations.

The parameters to be adjusted will influence the slanted edge MTF and the texture MTF to different degrees. This will be described in greater detail with reference to FIG. 9. FIG. 9 illustrates plots of a slanted edge MTF and a texture MTF according to some exemplary implementations. As illustrated in FIG. 9, a K term corresponding to a horizontal sharpening degree (K1) 216, or a vertical sharpening degree (K2) 224 as discussed above influences both the slanted edge MTF and the texture MTF to a large degree. For example, when K is set to 1.2, the slanted edge MTF has a peak value of approximately 1.4, and a texture MTF has a peak value of approximately 1.3. On the other hand, when K is set to 3, the slanted edge MTF has a peak value of approximately 4.9, and the texture MTF has a peak value of approximately 0.9. As a result, it is clear that a change in the sharpening degree has a substantial impact on the MTF curves. Similarly, the parameters E1-E5 discussed above will have different impacts on the MTF curve. For example, the subtraction threshold E1 will have a slight influence on the slanted edge MTF, but will have a clear influence on texture MTF. Alternatively, the clamping value E2 will have a clear influence on the slanted edge MTF and only a slight influence on texture MTF.

In order to avoid over-sharpening through adjustment of the various parameters, an over-sharpening term may be included in the cost function. An over-sharpening term may provide for adjustment of parameters to reduce artifacts created edge sharpening operations. For example, such artifacts may appear as overshoots (i.e., overly bright pixels near a transition from a dark region) or undershoots (i.e., overly dark pixels near a transition from a bright region). The filtering of the captured image by the ASF 14 based on a particular set of parameters will be the primary source of over-sharpening artifacts.

The over-sharpening term of the cost function may provide a means to provide an upper bound of the MTF curves. For example, with returned reference to FIG. 9, the MTF may be bounded at approximately 1.2. The over-sharpening term may be configured to provide a value for bounding the cost function to a predetermined peak limit. For example, the over-sharpening term corresponding to the slanted edge MTF and the texture MTF may be provided as described in Equations 7 and 8 below:

$$\max(\text{MTF}_{slant}^{peak}, a_{const}) - a_{const} \qquad \text{Eq. (7)}$$

$$\max(\text{MTF}_{txt}^{peak}, b_{const}) - b_{const} \qquad \text{Eq. (8)}$$

wherein $\text{MTF}_{slant}^{peak}$ corresponds to a peak value of the slanted edge MTF, $a_{const}$ corresponds to a constant upper bound of the slanted edge MTF, $\text{MTF}_{txt}^{peak}$ corresponds to a peak value of the texture MTF, and $b_{const}$ corresponds to a constant upper bound of the texture MTF. For example, if $a_{const}$ and $b_{const}$ are set to 1.1, the over-sharpening terms will provide a value corresponding to the over-sharpening amount above the upper bound to the cost function, and the parameters can be adjusted accordingly. Alternatively, if the corresponding MTF peak is below the upper bound, the term will be reduced to 0 and will have no influence on determination of updated parameters by the cost function. The values of $a_{const}$ and $b_{const}$ may correspond to any value of upper bound for the corresponding MTF curve, and may be set to different values from one another based on adjustment requirements of the system.

Additionally, a noise term of the cost function may be calculated based on analysis of an image of a captured test target. With returned reference to FIG. 6, a test target may include a pixel noise quantification pattern. The pixel noise quantification pattern provides information that may be used to quantify noise of the camera sensor (e.g., pattern noise). Such a pattern may be configured to include one or more regions that have a low pixel-to-pixel variance (e.g., to reduce sources of pixel-to-pixel response differences other than sensor noise). For example, such a pattern may include one or more flat-field regions. One such example is a pattern as shown in FIG. 6, which includes nine flat-field regions configured as square regions surrounding the texture test target. The square regions may correspond to regions having different contrasts. For example, the square regions may include a highly saturated patch (e.g., maximum intensity, or a normalized luminance at or near 1.0) to characterize noise in highlight areas; a midtone region (e.g., a normalized luminance at or near 0.5) to characterize noise in midtone areas; and a highly unsaturated region (e.g., minimum intensity, or a normalized luminance at or near 0.0) to characterize noise in shadow areas. Additionally, the square regions may include patches which correspond to varying luminance values within the range of zero to 1.0.

A noise term of the cost function may be calculated by analyzing a captured image having uniform regions. The noise term may be designated as $V_{noise}$. $V_{noise}$ may correspond to the sum of standard deviations of the uniform patches, or square regions, previously described. As a result, the noise term may be used by the cost function in order to reduce the effect that parameter adjustment may have on introducing noise to the system.

The test targets are processed by the ASF simulator 14 using the various parameters as discussed above. The sharpness of the processed images may then be evaluated in order to determine the optimal parameters. The cost function may include one or more of a slanted edge sharpness index, a texture sharpness index, a slanted edge oversharpening index, a texture oversharpening index, and a noise term. As an example, the cost function may be represented by Equation 9 below:

$$\text{cost} = -\omega_1 \text{SQF}_{slant} + \omega_2(\max(\text{MTF}_{slant}^{peak}, a_{const}) - a_{const}) - \omega_3 \text{SQF}_{txt} + \omega_4(\max(\text{MTF}_{txt}^{peak}, b_{const}) - b_{const}) + \omega_5 V_{noise} \qquad \text{Eq. (9)}$$

wherein $\text{SQF}_{slant}$ corresponds to a subjective quality factor based on a slanted edge MTF, $\max(\text{MTF}_{slant}^{peak}, a_{const}) - a_{const}$ corresponds to an slanted edge over-sharpening term as discussed above, $\text{SQF}_{txt}$ corresponds to a subjective qualify factor based on a texture MTF, $\max(\text{MTF}_{txt}^{peak}, b_{const}) - b_{const}$ corresponds to a texture over-sharpening term as discussed above, and $V_{noise}$ corresponds to a noise term as discussed above. Each term of the cost function of Equation 9 may include a weight coefficient ω. The weight coefficient ω may be used to calibrate the importance, or level of impact, of each of the terms in the cost function on the determination of sharpness parameters. The weight coefficients may be calibrated separately from the ASF parameters, or may be set such that the same weight coefficients are used for different image capture devices.

Figure 10:
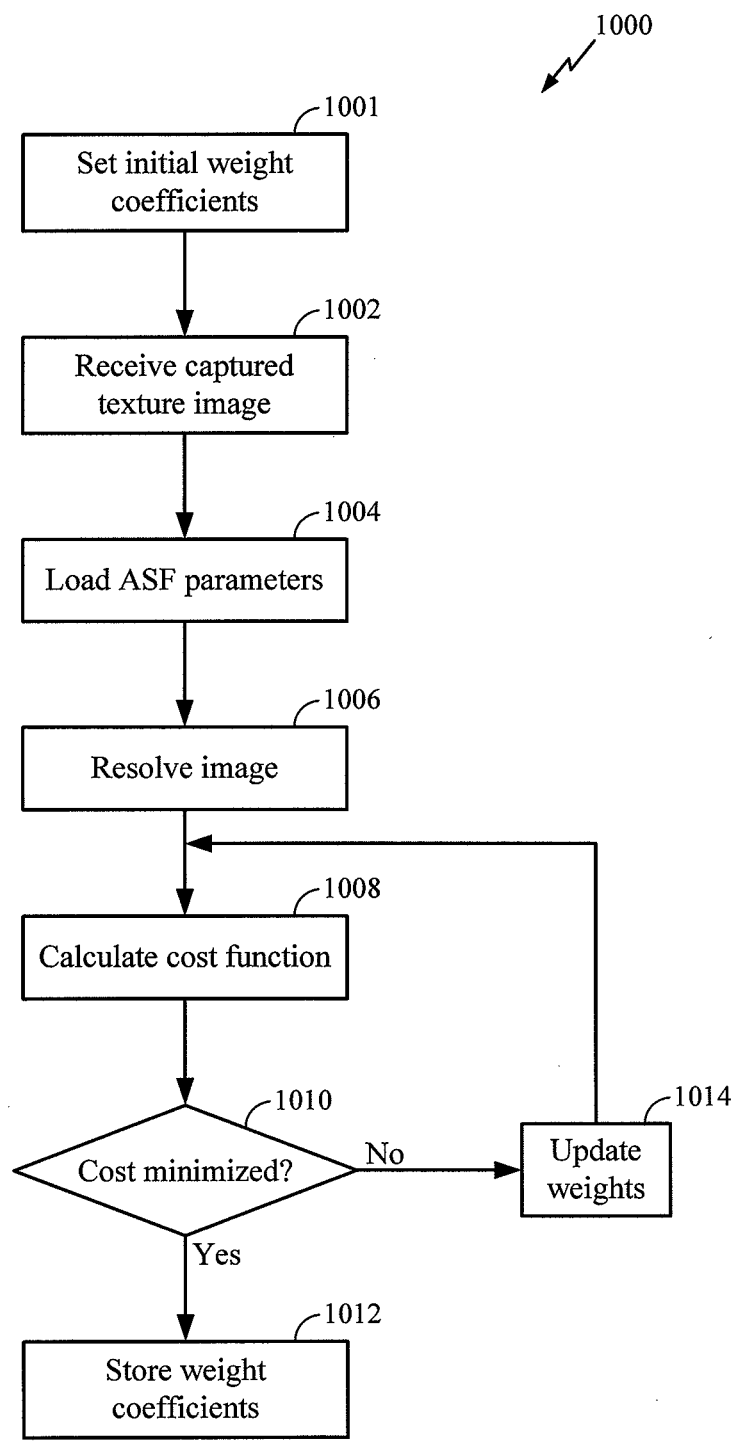
FIG. 10 illustrates a method 1000 of determining weights of a cost function according to some exemplar implementations.

FIG. 10 illustrates a method 1000 of determining weights of a cost function according to some exemplar implementations. As illustrated in FIG. 10, the method may begin by setting initial weights of the cost function at block 1001. The initial weight coefficients may correspond to predetermined values. The predetermined values may, for example, be based on prior calibration of sharpness parameters. At block 1002, a captured image of a texture test target is received. The texture test target may, for example, correspond to the texture test target of FIG. 6 discussed above. At block 1004, ASF parameters for filtering, or resolving, the captured image are loaded. The ASF parameters may correspond to sharpness parameters which are stored in a sharpness parameter storage unit 32. For example, the ASF parameters may be determined according to the method described with reference to FIG. 4 above.

At block 1006, the captured texture image is resolved based on the loaded ASF parameters. At block 1008, a cost function is calculated in order to analyze the sharpness of the resolved image. The cost function may include any combination of the sharpness indices discussed above. At decision block 1010, it is determined whether the weights have been optimized. That is, it is determined whether the cost function has been minimized, thereby producing optimum sharpness weight values corresponding to the sharpness parameters. If the cost function has been minimized, the weight coefficients are stored at block 1012 for use by the parameter determination module 30. On the other hand, if the cost function has not been minimized, the weight coefficients are updated at block 1014, and the method returns to re-calculate the cost function based on updated weights at block 1008. The method iteratively continues to update the weight coefficients and calculate the cost function until the cost function is minimized. As a result, optimum weight values may be determined and stored for use by the parameter determination module 30.

The method illustrated in FIG. 10 may be performed prior to or following the determination of sharpness parameters according to the method described with respect to FIG. 4 above. Additionally, the method of determining sharpness parameters may be re-performed following the determination of the weight coefficients. As a result, the two methods can be iteratively performed such that the sharpness parameters and the weight coefficients are further refined.

The process of updating the weight coefficients and the sharpness parameters discussed with respect to FIGS. 4 and 10 above may be performed based on any number of techniques in order to quickly arrive at the optimum values. For example, one technique for optimizing a large parametric space that may be used is a differential evolution technique. A differential evolution technique evaluates populations of solutions, where each solution is a genetic representation of the solution domain (i.e., of the parametric space) that encodes a particular set of parameter values. The differential evolution method iteratively generates a new population of genomes from the previous population until a genome that satisfies a fitness criterion is found and/or until a maximum number of iterations have been performed. The population of solutions at each iteration of the differential evolution technique is also called a generation.

In the case of a differential evolution technique, the method of updating ASF parameters or weight coefficients may be configured to encode the value of each parameter to be optimized as a vector of bits that is long enough to cover the range of possible values of the parameter, and to concatenate the vector for the individual parameters to obtain a genome that is a vector of bits having some length L. In this system, each vector of length L defines a particular solution to the optimization problem (i.e., a particular data point in the parametric space). One of skill in the art will recognize that a vector is one example of providing the particular solutions, and that other data structures may be used for defining the particular solutions.

The method of updating parameters may be configured to begin with an initial population that is randomly generated (e.g., random vectors of length n). The random solutions may be based on combinations of parameter values which are set randomly within particular limits for each parameter. In this case, for each genome in the population, a post-processing operation is performed according to the parameter values encoded in the genome to generate a corresponding filtered representation. A cost function is analyzed for each filtered representation corresponding to each genome to determine the fitness of the genome.

Subsequent iterations of the method are based on updated parameters which are generated from a new population from the previous generation. For each solution (i.e. X), or genome, a new candidate may be generated according to Equation 10 below:

$$v = X_{r1,G} + F(X_{r2,G} - X_{r3,G})$$ Eq. (10)

wherein v is a vector corresponding to the new candidate of parameter values, r1, r2, and r3 correspond to a random points within the population of solutions, $X_{r1,G}$ corresponds to a first solution vector of parameters in generation G of solution vector X, and $X_{r2,G}$, $X_{r3,G}$ correspond to a second and third solution vector of parameters respectively in generation G. Each of solutions $X_{r1,G}$, $X_{r2,G}$, $X_{r3,G}$ is chosen randomly from the population of solutions. The function $F(X_{r2,G} - X_{r3,G})$ provides a positive value for a shift from solution vector $X_{r2,G}$ to $X_{r3,G}$. In turn, v corresponds to a newly generated solution vector of parameters based on the solutions of the previous generation G. If the cost function of solution vector v is less than the cost function of corresponding to the solution X being analyzed, then v is selected as a new solution vector in the population of solutions and X is replaced in the population of solutions with v. If the cost function of solution vector v is not less than the cost function of any of the solutions in the population, then v is discarded. The method of updating the parameters according to Equation 10 above is performed iteratively for all solutions in the population until the cost function is minimized.

It may also be desirable to configure the method of updating parameters to provide every genome with the chance to reproduce. The method of updating parameters may also be performed such that the probability that a genome will reproduce is based on the corresponding cost function value for a processed image generated according to that genome from a captured image. Additionally or alternatively, the method of updating parameters may be configured to generate a genome of the new generation by performing a mutation operation. A mutation operation enables additional variation in updating parameters. According to some examples of a mutation differential evolution method, a subset of parameters for mutation are selected to be updated. That is, rather than replacing the solution X with the new solution v, X is instead partially modified such that only certain parameters of vector X are replaced with corresponding parameters of vector v. The resulting solution vector (i.e. mutation of X with parameters of v) is added to the population of solutions.

As discussed above, disclosed implementations relate to a system for automatic adaptive image sharpening which reduces the amount of time required to arrive at sharpness parameters for an image processor of an image capture device. For example, for a five megapixel camera, the disclosed system may determine the sharpness parameters in as little as approximately fifteen minutes. Additionally, the system may eliminate reliance on subjective evaluations of sharpness which are based on the expertise of camera technicians.

Thus, a skilled artisan will appreciate that the configurations and principles of the exemplary implementations can be adapted for any other electronic system. The circuits employing the above described configurations can be implemented into various electronic devices or integrated circuits. Examples of the electronic devices can include, but are not limited to, consumer electronic products, parts of the consumer electronic products, electronic test equipment, healthcare monitors, etc. Further, the electronic device can include unfinished products.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain exemplary implementations, other exemplary implementations that are apparent to those of ordinary skill in the art, including exemplary implementations that do not provide all of the features and advantages set forth herein, are also within the scope of this invention. Moreover, the various exemplary implementations described above can be combined to provide further exemplary implementations. In addition, certain features shown in the context of one embodiment can be incorporated into other exemplary implementations as well. Accordingly, the scope of the present invention is defined only by reference to the appended claims.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that any of the various illustrative logical blocks, modules, cores, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, cores, and circuits described in connection with the aspects disclosed herein and in connection with FIGS. 1-5 may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, cores, and circuits may include antennas and/or transceivers to communicate with various components within the network or within the device. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules or cores may be implemented in some other manner as taught herein. Furthermore, the functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a tangible, non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be in the form of a non-transitory or transitory computer-readable medium. Also, any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use exemplary implementations within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method for initially calibrating an image capture device, comprising:
   receiving a captured image of at least one test target;
   resolving the captured image;
   determining at least one sharpness index by analyzing the resolved image in a frequency domain;
   determining a cost function based on the at least one sharpness index, wherein the at least one sharpness index includes at least a first sharpness index and a second sharpness index, and wherein the first sharpness index corresponds to a slanted edge modular transfer function (MTF) that is based on an edge spread function and the second sharpness index corresponds to a texture modular transfer function (MTF) that is based on a power spectral density of the resolved image;

minimizing the cost function to determine sharpness parameters; and storing the sharpness parameters for use by the image capture device.

2. The method of claim 1, wherein the captured image is received into a solid state memory.

3. The method of claim 1, wherein storing the sharpness parameters comprises storing the sharpness parameters in a memory in the image capture device.

4. The method of claim 1, wherein determining the at least one sharpness index is performed by a processor external to the image capture device.

5. The method of claim 1, wherein the image capture device is a wireless telephone.

6. The method of claim 1, wherein the cost function includes a plurality of weighting coefficients corresponding to the first sharpness index and the second sharpness index.

7. The method of claim 6, further comprising determining the plurality of weighting coefficients by capturing an image of a texture test target; and resolving the captured image of the texture test target based on the sharpness parameters.

8. The method of claim 1, wherein the at least one test target includes a slanted edge test target and a dead-leaves test target.

9. The method of claim 1, wherein minimizing the cost function includes evaluating the sharpness of the resolved image.

10. The method of claim 1, further comprising determining a set of updated parameters based on the cost function; and resolving the image based on the set of updated parameters.

11. The method of claim 10, further comprising performing a sequence of iterations of resolving the image based on updated parameters; and determining the sharpness parameters based on the sequence of iterations.

12. The method of claim 1, further comprising inputting initial parameters to a sharpening filter; and resolving the captured image based on the initial parameters.

13. An apparatus for initially calibrating an image capture device, comprising:

means for receiving a captured image of at least one test target;

means for resolving the captured image;

means for determining at least one sharpness index by analyzing the resolved image in a frequency domain comprising instructions for calculating at least one of a texture sharpness index that is based on a power spectral density of the resolved image and a slanted edge sharpness index that is based on an edge spread function;

means for determining a cost function based on the at least one sharpness index;

means for minimizing the cost function to determine sharpness parameters; and means for storing the sharpness parameters for use by the image capture device.

14. The apparatus of claim 13, wherein the apparatus is a wireless telephone.

15. The apparatus of claim 13, wherein the means for receiving a captured image is a memory.

16. The apparatus of claim 13, wherein the means for resolving the captured image comprises an adaptive spatial filter (ASF) simulator.

17. The apparatus of claim 13, wherein the means for determining a cost function comprises instructions for determining a cost function based on a sum of the at least one sharpness index.

18. The apparatus of claim 13, wherein the means for minimizing a cost function comprises instructions for minimizing the cost function based on a quality threshold and a number of iterations of updating filtering parameters.

19. The apparatus of claim 13, wherein the means for storing the sharpness parameters comprises a memory.

20. The apparatus of claim 13, wherein the cost function includes a plurality of weighting coefficients corresponding to at least one of the texture sharpness index and the slanted edge sharpness index.

21. The apparatus of claim 20, further comprising means for determining the plurality of weighting coefficients, wherein the means for determining the plurality of weighting coefficients includes:

means for capturing an image of a texture test target; and means for resolving the captured image of the texture test target based on the sharpness parameters.

22. The apparatus of claim 13, wherein the first sharpness index corresponds to a slanted edge modular transfer function (MTF) that is based on a edge spread function and the second sharpness index corresponds to a texture modular transfer function (MTF) that is based on a power spectral density of the captured image.

23. The apparatus of claim 13, wherein the at least one test target includes a slanted edge test target and a dead-leaves test target.

24. The apparatus of claim 13, wherein minimizing the cost function includes evaluating the sharpness of the resolved image.

25. The apparatus of claim 13, further comprising means for determining a set of updated parameters based on the cost function; and means for resolving the image based on the set of updated parameters.

26. The apparatus of claim 25, further comprising performing a sequence of iterations of resolving the image based on updated parameters; and determining the sharpness parameters based on the sequence of iterations.

27. A non-transitory computer-readable medium having stored thereon code that when executed performs a method comprising:

receiving a captured image of at least one test target;

resolving the captured image;

determining at least one sharpness index by analyzing the resolved image in a frequency domain, wherein the at least one sharpness index comprises at least one of a texture sharpness index that is based on a power spectral density of the resolved image and a slanted edge sharpness index that is based on an edge spread function;

determining a cost function based on the at least one sharpness index;

minimizing the cost function to determine sharpness parameters; and storing the sharpness parameters for use by the image capture device.

28. An apparatus for initially calibrating an image capture device, comprising:

a filter configured to receive a captured image and resolve the captured image; and a parameter determination module configured to:

determine at least one sharpness index by analyzing the resolved image in a frequency domain, wherein the at least one sharpness index comprises at least one of a texture sharpness index that is based on a power spectral density of the resolved image and a slanted edge sharpness index that is based on an edge spread function;

determine a cost function based on the at least one sharpness index;

minimize the cost function to determine sharpness parameters; and store the sharpness parameters for use by the image capture device.

29. The apparatus of claim 28, wherein the cost function includes a plurality of weighting coefficients corresponding to at least one of the texture sharpness index and the slanted edge sharpness index.

30. The apparatus of claim 28, further comprising a sensor configured to capture an image of at least one test target.

31. The apparatus of claim 30, wherein the sensor is further configured to capture an image of a texture test target, wherein the filter is further configured to resolve the captured image of the texture test target based on the sharpness parameters, and wherein the parameter determination module is further configured to determine the plurality of weighting coefficients based on the resolved image of the texture test target.

32. The apparatus of claim 28, wherein the first sharpness index corresponds to a slanted edge modular transfer function (MTF) based on the resolved image and the second sharpness index corresponds to a texture modular transfer function (MTF) based on the resolved image.

33. The apparatus of claim 28, wherein the at least one test target includes a slanted edge test target and a dead-leaves test target.

34. The apparatus of claim 28, wherein minimizing the cost function includes evaluating the sharpness of the resolved image.

35. The apparatus of claim 28, wherein the parameter determination module is further configured to determine a set of updated parameters based on the cost function, and wherein the filter is configured to resolve the image based on the set of updated parameters.

36. The apparatus of claim 35, wherein the filter is further configured to perform a sequence of iterations of resolving the image based on updated parameters, and the parameter determination module is configured to determine the sharpness parameters based on the sequence of iterations.

37. The apparatus of claim 28, wherein the apparatus is a wireless telephone.

38. A method for initially calibrating an image capture device, comprising:

receiving a captured image of at least one test target;
resolving the captured image;
determining a first sharpness index by analyzing the resolved image in a frequency domain, wherein the first sharpness index is based on a power spectral density of a captured flat field image, and wherein the captured flat field image was captured by an image sensor calibrated to remove artifacts caused by variations in pixels of the image sensor;
determining a cost function based on the first sharpness index;
minimizing the cost function to determine sharpness parameters; and
storing the sharpness parameters for use by the image capture device.

39. The method of claim 38, wherein the captured test target image comprises an image of a texture test target.

40. The method of claim 1, wherein the texture modular transfer function is defined by:

$$MTF_{txt}(f) = \sqrt{\frac{PSD_{meas}(f) - PSD_{noise}(f)}{PSD_{ideal}(f)}}$$

where
  $PSD_{meas(f)}$ corresponds to a power spectral density measured for a captured texture test target image,
  $PSD_{noise(f)}$ corresponds to a power spectral density of noise of a captured image derived from the calculation of the power spectral density of a captured flat-field image, and
  $PSD_{ideal(f)}$ corresponds to a power spectral density of a texture test target.

41. The method of claim 1, wherein the slanted edge MTF is defined by:

MTF=DFT[LSF] where:

LSF is a line spread function defined by the first derivative of an edge spread function of the captured image, and
DFT[LSF] is the discrete Fourier transform of the line spread function (LSP).

42. An apparatus for initially calibrating an image capture device, comprising:

means for receiving a captured image of at least one test target;
means for resolving the captured image;
means for determining a first sharpness index by analyzing the resolved image in a frequency domain, wherein the first sharpness index is based on a power spectral density of a captured flat field image, and wherein the captured flat field image was captured by an image sensor calibrated to remove artifacts caused by variations in pixels of the image sensor;
means for determining a cost function based on the first sharpness index;
means for minimizing the cost function to determine sharpness parameters; and
means for storing the sharpness parameters for use by the image capture device.

43. An apparatus for initially calibrating an image capture device, comprising:

a filter configured to receive a captured image and resolve the captured image; and
a parameter determination module configured to:
  determine a first sharpness index by analyzing the resolved image in a frequency domain, wherein the first sharpness index is based on a power spectral density of a captured flat field image, wherein the captured flat field image was captured by an image sensor calibrated to remove artifacts caused by variations in pixels of the image sensor;
  determine a cost function based on the first sharpness index;
  minimize the cost function to determine sharpness parameters; and
  store the sharpness parameters for use by the image capture device.

* * * * *